(12) United States Patent
Wakita et al.

(10) Patent No.: US 7,709,142 B2
(45) Date of Patent: May 4, 2010

(54) ELECTROLYTIC SOLUTION CONTAINING 4-FLUORO-1, 3-DIOXOLANE-2-ONE SOLVENT

(75) Inventors: Shinya Wakita, Fukushima (JP); Izaya Okae, Fukushima (JP); Yosuke Ushio, Fukushima (JP); Yoshiaki Takeuchi, Fukushima (JP); Saori Tokuoka, Fukushima (JP)

(73) Assignee: Sony Corporation, Tokyo (JP)

( * ) Notice: Subject to any disclaimer, the term of this patent is extended or adjusted under 35 U.S.C. 154(b) by 60 days.

(21) Appl. No.: 11/567,951

(22) Filed: Dec. 7, 2006

(65) Prior Publication Data
US 2007/0148541 A1 Jun. 28, 2007

(30) Foreign Application Priority Data
Dec. 13, 2005 (JP) ............................ P2005-359135
Jul. 18, 2006 (JP) ............................ P2006-195608

(51) Int. Cl.
*H01M 6/04* (2006.01)
*H01M 6/16* (2006.01)

(52) U.S. Cl. .................. 429/200; 429/330; 429/331; 429/332; 429/328; 429/338

(58) Field of Classification Search ................ 429/200, 429/330, 331, 332, 328, 338
See application file for complete search history.

(56) References Cited

U.S. PATENT DOCUMENTS 6,479,192 B1 * 11/2002 Chung et al. ................. 429/338
2006/0228626 A1 * 10/2006 Kawashima et al. ........ 429/200

FOREIGN PATENT DOCUMENTS

JP          09-204936       8/1997

* cited by examiner

*Primary Examiner*—Dah-Wei Yuan
*Assistant Examiner*—Angela J. Martin
(74) *Attorney, Agent, or Firm*—Sonnenschein Nath & Rosenthal LLP

(57) ABSTRACT

A battery capable of obtaining a high energy density and obtaining superior cycle characteristics is provided. The thickness of a cathode active material layer is from 100 μm to 130 μm. The thickness of an anode active material layer is from 85 μm to 120 μm, and the volume density of the anode active material layer is from 1.7 $g/cm^3$ to 1.85 $g/cm^3$. An electrolytic solution contains 4-fluoro-1,3-dioxolane-2-one. Thereby, even when the thicknesses of the cathode active material layer and the anode active material layer are increased, the diffusion and acceptance of lithium in an anode are improved, and superior cycle characteristics can be obtained.

16 Claims, 2 Drawing Sheets

ELECTROLYTIC SOLUTION CONTAINING 4-FLUORO-1, 3-DIOXOLANE-2-ONE SOLVENT

CROSS REFERENCES TO RELATED APPLICATIONS

The present invention contains subject matter related to Japanese Patent Application JP 2005-359135 filed in the Japanese Patent Office on Dec. 13, 2005 and Japanese Patent Application JP 2006-195608 filed in the Japanese Patent Office on Jul. 18, 2006, the entire contents of which being incorporated herein by references.

BACKGROUND OF THE INVENTION

1. Field of the Invention

The present invention relates to a battery using a carbon material as an anode active material.

2. Description of the Related Art

In recent years, downsizing and weight saving of portable electronic devices represented by a mobile phone, a PDA (Personal Digital Assistant), and a notebook personal computer have been actively promoted. As a part thereof, improving an energy density of a battery as a driving power source for such electronic devices, in particular, of a secondary battery has been strongly desired.

As a secondary battery capable of providing a high energy density, for example, the secondary batteries using lithium (Li) as an electrode reactant are known. Specially, the lithium ion secondary batteries using a carbon material capable of inserting and extracting lithium for the anode are widely used practically. However, in the lithium ion secondary battery using the carbon material for the anode, the technology has been already developed to the degree close to its theoretical capacity. Therefore, as a method to further improve the energy density, it has been considered that the thickness of the active material layer is increased to increase the ratio of the active material layer in the battery, and the ratios of the current collector and the separator are lowered (refer to Japanese Unexamined Patent Application Publication No. 9-204936).

SUMMARY OF THE INVENTION

However, when the thickness of the active material layer is increased without changing the capacity of the battery, the area of the current collector is relatively decreased. Therefore, when charged, the current density to the anode is increased. In the result, capacities of diffusion of lithium and electrochemical reception of lithium in the anode fall short, and thus a lithium metal is easily precipitated. The lithium metal precipitated in the anode as above is easily deactivated, leading to significant lowering of the cycle characteristics. Consequently, it has been difficult to increase the thickness of the active material layer.

In view of the foregoing, in the present invention, it is desirable to provide a battery capable of obtaining a high energy density and superior cycle characteristics.

According to an embodiment of the invention, there is provided a battery including a cathode, an anode, and an electrolytic solution. The cathode has a cathode active material layer with a thickness of from 100 μm to 130 μm. The anode has an anode active material layer containing a carbon material as an anode active material and having the thickness of from 85 μm to 120 μm and the volume density of from 1.7 g/cm$^3$ to 1.85 g/cm$^3$. The electrolytic solution contains a solvent containing 4-fluoro-1,3-dioxolane-2-one.

According to the battery of the embodiment of the invention, the electrolytic solution contains 4-fluoro-1,3-dioxolane-2-one. Therefore, a favorable coating can be formed on the anode. Thus, even when the thickness of the anode active material layer is increased and the volume density thereof is increased, the diffusion and acceptance of lithium in the anode can be improved. Therefore, lithium metal is prevented from being precipitated on the anode. Consequently, the energy density can be improved, and superior cycle characteristics can be obtained.

In particular, when the content of 4-fluoro-1,3-dioxolane-2-one in the solvent is in the range from 0.1 wt % to 30 wt %, or when the ratio B/A of the specific surface area B (m$^2$/g) of the carbon material in the anode to the content A (wt %) of 4-fluoro-1,3-dioxolane-2-one in the solvent is in the range from 0.02 to 1.3, higher effects can be obtained.

Further, when the electrolytic solution contains lithium hexafluorophosphate, synergy effect with 4-fluoro-1,3-dioxolane-2-one is obtained and thus a more favorable coating can be formed. Therefore, higher effects can be obtained.

Further, when the electrolytic solution contains vinylene carbonate, a denser and high quality complex coating can be formed and thus more improvement of the performance can be expected.

Other and further objects, features and advantages of the invention will appear more fully from the following description.

DETAILED DESCRIPTION OF THE PREFERRED EMBODIMENT

An embodiment of the invention will be hereinafter described in detail with reference to the drawings.

Figure 1:
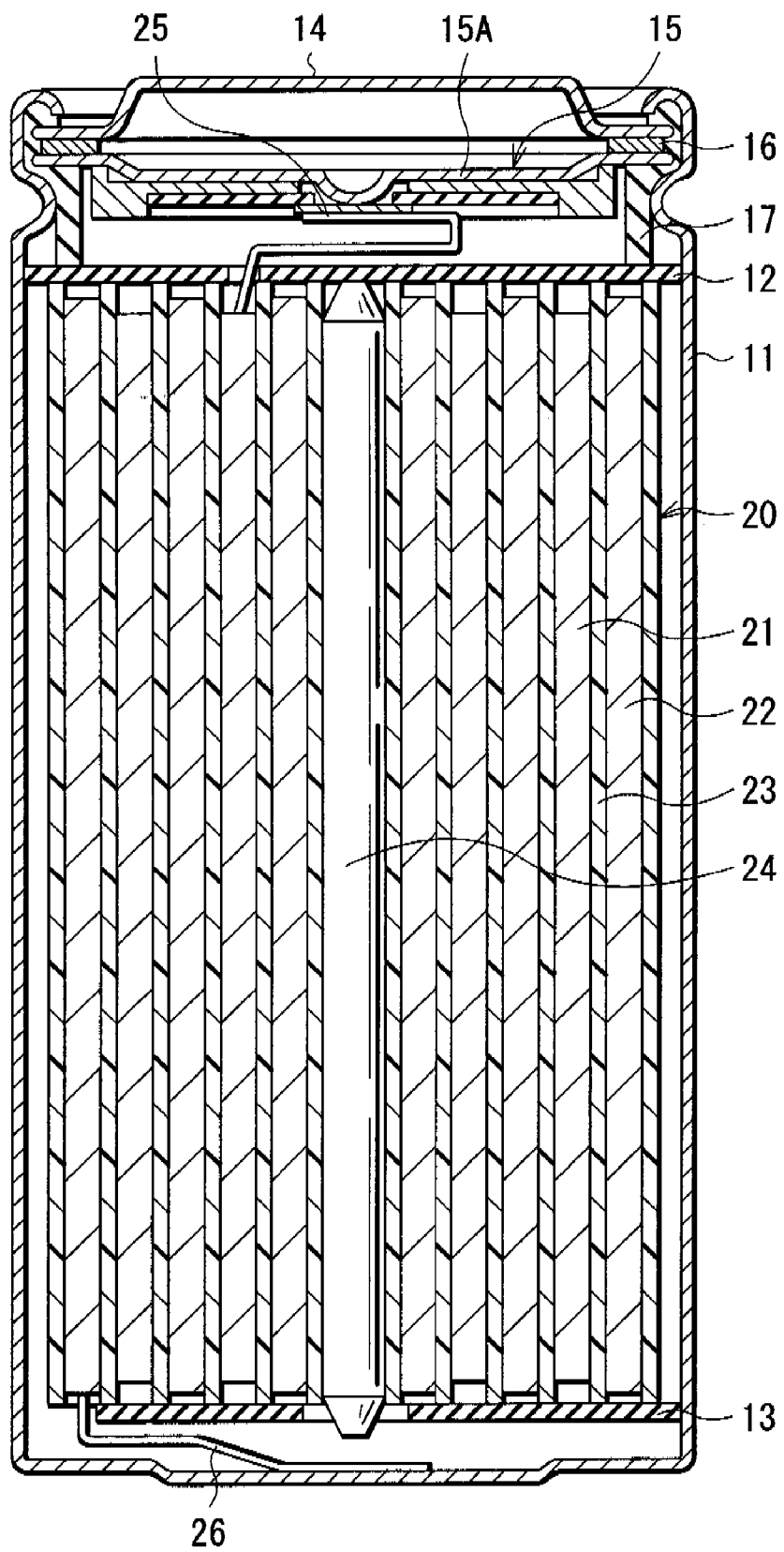
FIG. 1 is a cross section showing a structure of a secondary battery according to an embodiment of the invention.

FIG. 1 shows a cross sectional structure of a secondary battery according to an embodiment of the invention. The secondary battery is a so-called cylinder type battery, and has a spirally wound electrode body 20 in which a strip-shaped cathode 21 and a strip-shaped anode 22 are spirally wound with a separator 23 in between inside a battery can 11 in the shape of an approximately hollow cylinder. The battery can 11 is made of, for example, iron (Fe) plated by nickel (Ni). One end of the battery can 11 is closed, and the other end thereof is opened. Inside the battery can 11, a pair of insulating plates 12 and 13 is respectively arranged perpendicular to the winding periphery face, so that the spirally wound electrode body 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is thereby hermetically sealed. The battery cover 14 is, for example, made of a material similar to that of the battery can 11. The safety valve mechanism 15 is electrically connected to the battery cover 14 through the PTC device 16. When the internal pressure of the battery becomes a certain level or more by internal short circuit, external heating or the like, a disk plate 15A flips to cut the electrical connection between the battery cover 14 and the spirally wound electrode body 20. When temperature rises, the PTC device 16 limits a current by increasing the resistance value to prevent abnormal heat generation by a large current. The gasket 17 is made of, for example, an insulating material and its surface is coated with asphalt.

For example, a center pin 24 is inserted in the center of the spirally wound electrode body 20. A cathode lead 25 made of aluminum (Al) or the like is connected to the cathode 21 of the spirally wound electrode body 20. An anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

Figure 2:
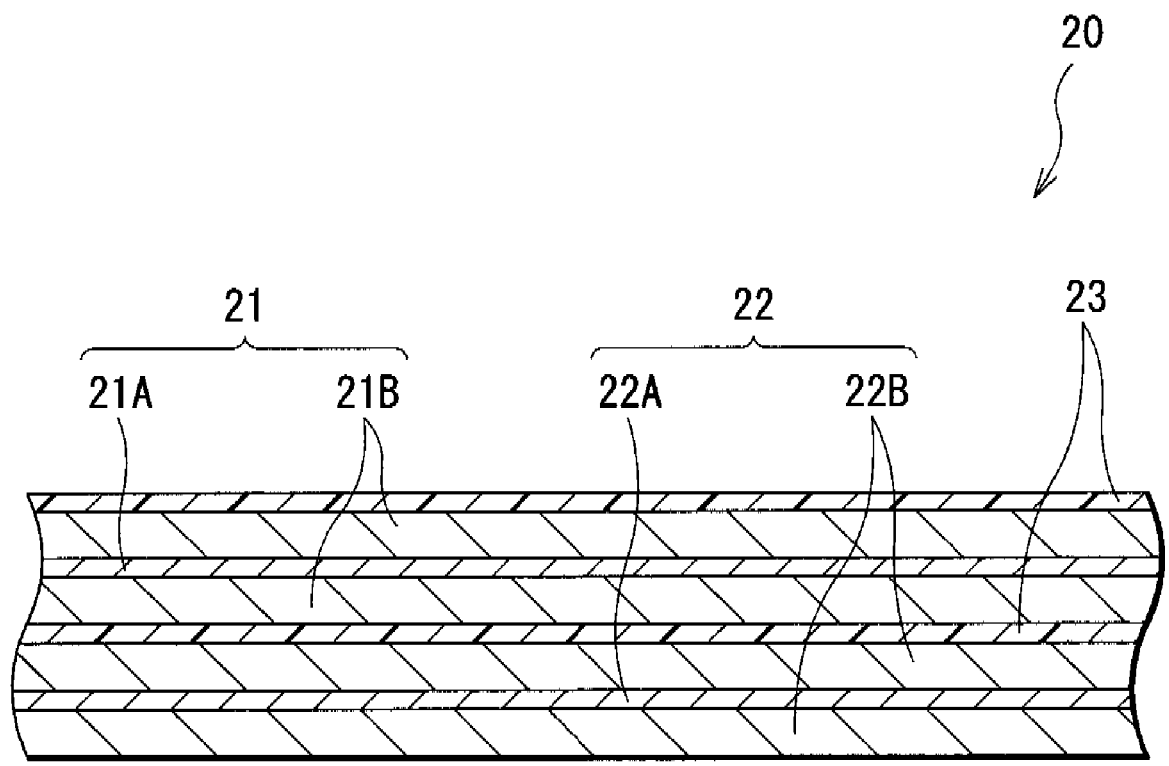
FIG. 2 is a cross section showing an enlarged part of a spirally wound electrode body in the secondary battery shown in FIG. 1.

FIG. 2 shows an enlarged part of the spirally wound electrode body 20 shown in FIG. 1. The cathode 21 has a structure in which, for example, a cathode active material layer 21B is provided on the both faces of a cathode current collector 21A having a pair of opposed faces. Though not shown, the cathode active material layer 21B may be provided on only one face of the cathode current collector 21A. The cathode current collector 21A is, for example, made of a metal foil such as an aluminum foil, a nickel foil, and a stainless foil.

The cathode active material layer 21B contains, for example, as a cathode active material, one or more cathode materials capable of inserting and extracting lithium as an electrode reactant. As a cathode material capable of inserting and extracting lithium, for example, a lithium-containing compound such as a lithium oxide, a lithium sulfide, an intercalation compound containing lithium, and a lithium phosphate compound can be cited. Specially, a complex oxide containing lithium and a transition metal element or a phosphate compound containing lithium and a transition metal element is preferable. In particular, a compound containing at least one of cobalt (Co), nickel, manganese (Mn), iron, aluminum, vanadium (V), and titanium (Ti) as a transition metal element is preferable. The chemical formula thereof is expressed by, for example, $Li_xMIO_2$ or $Li_yMIIPO_4$. In the formula, MI and MII include one or more transition metal elements. The values of x and y vary according to the charge and discharge state of the battery, and are generally in the range of $0.05 \leq x \leq 1.10$ and $0.05 \leq y \leq 1.10$.

As a specific example of the complex oxide containing lithium and a transition metal element, a lithium cobalt complex oxide ($Li_xCoO_2$), a lithium nickel complex oxide ($Li_xNiO_2$), a lithium nickel cobalt complex oxide ($Li_xNi_{1-z}Co_zO_2$ (z<1)), a lithium nickel cobalt manganese complex oxide ($Li_xNi_{(1-v-w)}Co_vMn_wO_2$ (v+w<1)), lithium manganese complex oxide having a spinel structure ($LiMn_2O_4$) or the like can be cited. As a specific example of the phosphate compound containing lithium and a transition metal element, for example, lithium iron phosphate compound ($LiFePO_4$) or a lithium iron manganese phosphate compound ($LiFe_{1-u}Mn_uPO_4$ (u<1)) can be cited.

As a cathode material capable of inserting and extracting lithium, other metal compound or a polymer material can be cited. As other metal compound, for example, an oxide such as titanium oxide, vanadium oxide, and manganese dioxide, or a disulfide such as titanium sulfide and molybdenum sulfide can be cited. As a polymer material, for example, polyaniline or polythiophene can be cited.

If necessary, the cathode active material layer 21B may contain an electrical conductor or a binder. As an electrical conductor, for example, a carbon material such as graphite, carbon black, and Ketjen black can be cited. One thereof is used singly, or two or more thereof are used by mixing.

Further, in addition to the carbon material, a metal material, a conductive polymer material or the like may be used, as long as the material has conductivity. As a binder, for example, a synthetic rubber such as styrene butadiene rubber, fluorinated rubber, and ethylene propylene diene rubber, or a polymer material such as polyvinylidene fluoride can be cited. One thereof is used singly, or two or more thereof are used by mixing.

The anode 22 has a structure in which an anode active material layer 22B is provided on the both faces of an anode current collector 22A having a pair of opposed faces. Though not shown, the anode active material layer 22B may be provided only on one face of the anode current collector 22A. The anode current collector 22A is made of, for example, a metal foil such as a copper foil, a nickel foil, and a stainless foil.

The anode active material layer 22B contains, for example, as an anode active material, one or more anode materials capable of inserting and extracting lithium as an electrode reactant. If necessary, the anode active material layer 22B may contain a binder similar to that of the cathode active material layer 21B, for example. As an anode material capable of inserting and extracting lithium, for example, a carbon material such as graphite, non-graphitizable carbon, and graphitizable carbon can be cited. Such a carbon material is preferable, since a change in crystal structure in charging and discharging is very little, a high charge and discharge capacity can be obtained, and favorable charge and discharge cycle characteristics can be obtained. In particular, graphite is preferable since graphite has a large electrochemical equivalent and provides a high energy density. Both natural graphite and artificial graphite may be used.

Graphite in which the lattice spacing $d_{002}$ in the C axis direction in X-ray diffraction is under 0.338 nm, and the peak intensity ratio $I_D/I_G$ is over 0.01 and equal to or less than 2.0, where the peak intensity existing in the region of 1570 $cm^{-1}$ to 1630 $cm^{-1}$ is $I_G$ and the peak intensity existing in the region of 1350 $cm^{-1}$ to 1370 $cm^{-1}$ is $I_D$ in the Raman spectrum using argon laser light with the wavelength of 514.5 nm is preferable. The lattice spacing $d_{002}$ can be measured by X-ray diffraction method in which, for example, CuKα rays are used as X-rays, and high purity silicon is used as a standard substance ("Carbon fiver," Sugiro Otani, pp. 733-742, 1986, Kindai Hensyu). Further, the true density of the graphite is preferably 2.10 $g/cm^3$ or more, and more preferably 2.18 $g/cm^3$ or more.

Further, the bulk density of the graphite is preferably 1.2 $g/cm^3$ or more, and the breaking strength thereof is preferably 50 MPa or more. Thereby, even when the anode active material layer 22B is pressed to increase the volume density, the lamellar structure of the graphite can be maintained, and insertion and extraction reaction of lithium can be smoothly maintained. The breaking strength of graphite particles can be obtained from Mathematical formula 1:

$$St(Sx) = 2.8P/(\pi \times d \times d) \qquad \text{Mathematical formula 1}$$

where St(Sx) represents the breaking strength (Pa), P represents the force (N) in the test, and d represents the average particle diameter (mm) of the particles. The average particle diameter d can be measured by, for example, laser diffraction particle size distribution measuring device.

The non-graphitizable carbon in which the face spacing of the (002) plane is 0.37 nm or more, the true density is under 1.70 g/cm$^3$, and the exothermic peak is not shown at 700 deg C. or more in the differential thermal analysis (DTA) in the air is preferable.

Further, in the secondary battery, by increasing the thicknesses of the cathode active material layer 21B and the anode active material layer 22B, the volumes of the cathode current collector 21A, the anode current collector 22A, and the separator 23 in the battery can be decreased, and the energy density can be improved. The thickness of the cathode active material layer 21B is in the range from 100 μm to 130 μm for one face of the cathode current collector 21A, and in the range from 200 μm to 260 μm for the both faces of the cathode current collector 21A in total. The thickness of the anode active material layer 22B is in the range from 85 μm to 120 μm for one face of the anode current collector 22A, and in the range from 170 μm to 240 μm for the both faces of the anode current collector 22A in total. When the thicknesses of the cathode active material layer 21B and the anode active material layer 22B are increased, the energy density can be improved. However, when the thicknesses are excessively increased, the lithium acceptance is lowered, and the battery characteristics such as heavy loading characteristics and cycle characteristics are lowered.

Further, the volume density of the anode active material layer 22B is in the range from 1.7 g/cm$^3$ to 1.85 g/cm$^3$. When the volume density is low, the amount of active material being filled in the battery is decreased, and thus it is difficult to sufficiently improve the energy density. Meanwhile, when the volume density is high, the lithium acceptance is lowered, and thus the battery characteristics such as heavy loading characteristics and cycle characteristics are lowered.

The separator 23 separates the cathode 21 from the anode 22, prevents current short circuit due to contact of the both electrodes, and lets through lithium ions. The separator 23 is made of, for example, a porous film made of a synthetic resin such as polytetrafluoroethylene, polypropylene, and polyethylene, or a ceramics porous film. The separator 23 may have a structure in which two or more of the foregoing porous films are layered. Specially, the porous film made of polyolefin is preferable, since it has a superior short circuit prevention effect and provides improved safety of the battery by shut down effect. In particular, polyethylene is preferable as a material composing the separator 23, since it provides shut-down effects in the range from 100 deg C. to 160 deg C. and has superior electrochemical stability. Further, polypropylene is also preferable. In addition, as long as a resin has chemical stability, such a resin may be used by being copolymerized with polyethylene or polypropylene, or by being blended with polyethylene or polypropylene.

An electrolytic solution is impregnated in the separator 23. The electrolytic solution contains, for example, a solvent and an electrolyte salt.

The solvent contains 4-fluoro-1,3-dioxolane-2-one, and may further contain other one or more materials by mixing. By using 4-fluoro-1,3-dioxolane-2-one, a favorable coating can be formed on the anode 22. Thus, as described above, even when the thickness of the anode active material layer 22B is increased and the volume density is increased, the diffusion and electrochemical acceptance of lithium ions can be improved. Further, the coating formed from 4-fluoro-1,3-dioxolane-2-one is thin and dense. Therefore, the lithium amount used for forming the coating is small, the charge and discharge efficiency is improved, and superior heavy loading characteristics can be obtained.

The content of 4-fluoro-1,3-dioxolane-2-one in the solvent is preferably in the range from 0.1 wt % to 30 wt %. Further, the content of 4-fluoro-1,3-dioxolane-2-one is preferably set as follows. That is, where the content of 4-fluoro-1,3-dioxolane-2-one in the solvent is A (weight %) and the specific surface area of the carbon material in the anode 22 is B (m$^2$/g), the ratio B/A of the specific surface area B to the content A is preferably in the range from 0.02 to 1.3. Within the foregoing ranges, higher effects can be obtained.

As other solvents, for example, an ambient temperature molten salt such as ethylene carbonate, propylene carbonate, butylene carbonate, vinylene carbonate, dimethyl carbonate, diethyl carbonate, ethyl methyl carbonate, γ-butyrolactone, γ-velerolactone, 1,2-dimethoxyethane, tetrahydrofuran, 2-methyl tetrahydrofuran, 1,3-dioxolane, 4-methyl-1,3-dioxolane, methyl acetate, methyl propionate, ethyl propionate, acetonitrile, glutaronitrile, adiponitrile, methoxyacetonitrile, 3-methoxypropylonitrile, N,N-dimethylformamide, N-methyl pyrrolidinone, N-methyl oxazolidinone, nitromethane, nitroethane, sulfolane, dimethyl sulfoxide, trimethyl phosphate, triethyl phosphate, ethylene sulfide, and bis trifluoro methyl sulfonyl imide trimethylhexyl ammonium can be cited. Specially, at least one selected from the group consisting of ethylene carbonate, propylene carbonate, vinylene carbonate, dimethyl carbonate, ethyl methyl carbonate, and ethylene sulfide is preferably mixed, since thereby superior charge and discharge capacity characteristics and charge and discharge cycle characteristics can be obtained.

In particular, when vinylene carbonate is contained as other solvent, more favorable coating can be formed on the anode 22, and the diffusion and electrochemical acceptance of lithium ions in the anode 22 can be further improved. Therefore, even when the thickness of the anode active material layer 22B is increased and the volume density is increased, the heavy loading characteristics, the cycle characteristics and the like can be further improved. However, in this case, the content of 4-fluoro-1,3-dioxolane-2-one in the solvent is preferably in the range from 0.1 wt % to 20 wt %, and the content of vinylene carbonate in the solvent is preferably in the range from 0.2 wt % to 5 wt %. Otherwise, the content of 4-fluoro-1,3-dioxolane-2-one is preferably in the range from 0.1 wt % to 20 wt %, and the weight ratio of vinylene carbonate to 4-fluoro-1,3-dioxolane-2-one is preferably in the range from 0.02 to 10. In such ranges, higher effects can be obtained.

As an electrolyte salt, lithium hexafluorophosphate (LiPF$_6$) is preferably contained. Thereby, synergy effect with 4-fluoro 1,3-dioxolane 2-one is obtained and thus a more favorable coating can be formed on the anode 22, and the diffusion and electrochemical acceptance of lithium ions in the anode 22 can be more improved. The content of lithium hexafluorophosphate in the electrolytic solution is preferably in the range from 0.5 mol/kg to 2 mol/kg. When the content is small, sufficient effects are not able to be obtained. Meanwhile, when the content is large, the viscosity of the electrolytic solution is increased, and the ion conductivity is lowered.

The electrolyte salt may contain other one or more kinds of materials by mixing, if necessary. As other electrolyte salt, for example, bis(pentafluoroethanesulfonyl)imide lithium (Li(C$_2$F$_5$SO$_2$)$_2$N), lithium perchlorate (LiClO$_4$), lithium arsenate hexafluoride (LiAsF$_6$), lithium borate tetrafluoride (LiBF$_4$), trifluoromethane sulfonic lithium (LiSO$_3$CF$_3$), bis (trifluoromethane sulfonyl)imide lithium (Li(CF$_3$SO$_2$)$_2$N), tris (trifluoromethane sulfonyl)methyl lithium (LiC(SO$_2$CF$_3$)$_3$), lithium chloride (LiCl), or lithium bromide (LiBr) can be cited.

The secondary battery can be manufactured, for example, as follows.

First, for example, a cathode active material, an electrical conductor, and a binder are mixed to prepare a cathode mixture, which is dispersed in a solvent such as N-methyl-2-pyrrolidone to obtain paste cathode mixture slurry. Subsequently, the cathode current collector 21A is coated with the cathode mixture slurry, and the solvent is dried. After that, the resultant is compression-molded by a rolling press machine or the like to form the cathode active material layer 21B and form the cathode 21. Otherwise, the cathode active material layer 21B may be formed by gluing the cathode mixture on the cathode current collector 21A.

Further, for example, a carbon material as an anode active material and a binder are mixed to prepare an anode mixture, which is dispersed in a solvent such as N-methyl-2-pyrrolidone to obtain paste anode mixture slurry. Subsequently, the anode current collector 22A is coated with the anode mixture slurry, and the solvent is dried. After that, the resultant is compression-molded by a rolling press machine or the like to form the anode active material layer 22B and thereby forming the anode 22. Otherwise, the anode active material layer 22B may be formed by gluing the anode mixture on the anode current collector 22A.

Next, the cathode lead 25 is attached to the cathode current collector 21A by welding or the like, and the anode lead 26 is attached to the anode current collector 22A by welding or the like. After that, the cathode 21 and the anode 22 are spirally wound with the separator 23 in between. The end of the cathode lead 25 is welded to the safety valve mechanism 15, and the end of the anode lead 26 is welded to the battery can 11. The spirally wound cathode 21 and the spirally wound anode 22 are sandwiched between the pair of insulating plates 12 and 13, and contained in the battery can 11. After the cathode 21 and the anode 22 are contained in the battery can 11, the electrolytic solution is injected into the battery can 11 and impregnated in the separator 23. After that, at the open end of the battery can 11, the battery cover 14, the safety valve mechanism 15, and the PTC device 16 are fixed by being caulked with the gasket 17. The secondary battery shown in FIG. 1 is thereby completed.

In the secondary battery, when charged, for example, lithium ions are extracted from the cathode active material layer 21B, and inserted in the anode active material layer 22B through the electrolytic solution. When discharged, for example, lithium ions are extracted from the anode active material layer 22B, and inserted in the cathode active material layer 21B through the electrolytic solution. In this embodiment, the thicknesses of the cathode active material layer 21B and the anode active material layer 22B are increased. Therefore, the areas of the cathode active material layer 21B and the anode active material layer 22B are decreased, and the current density to the anode 22 in charging is increased. However, in this embodiment, 4-fluoro-1,3-dioxolane-2-one is contained in the electrolytic solution. Therefore, the favorable coating is formed on the anode 22. Consequently, even if the current density to the anode 22 is high, the diffusion and electrochemical acceptance of lithium in the anode 22 are improved, and lithium metal is prevented from being precipitated on the anode 22.

As above, in this embodiment, since the electrolytic solution contains 4-fluoro-1,3-dioxolane-2-one, the favorable coating is formed on the anode 22. Therefore, even if the thickness of the anode active material layer 22B is increased and the volume density is increased, the diffusion and acceptance of lithium in the anode 22 can be improved. In the result, lithium metal is prevented from being precipitated on the anode 22. Consequently, the energy density can be improved, and superior cycle characteristics can be obtained.

In particular, when the content of 4-fluoro-1,3-dioxolane-2-one in the solvent is in the range from 0.1 wt % to 30 wt %, or the ratio B/A which is the specific surface area B ($m^2/g$) of the carbon material in the anode 22 to the content A (wt %) of 4-fluoro-1,3-dioxolane-2-one in the solvent is in the range from 0.02 to 1.3, higher effects can be obtained.

Further, when lithium hexafluorophosphate is contained in the electrolytic solution, synergy effect with 4-fluoro-1,3-dioxolane-2-one is thereby obtained and thus a more favorable coating can be formed, and higher effects can be obtained.

EXAMPLES

Further, specific examples of the invention will be described in detail.

Examples 1-1 to 1-7

The cylinder type secondary batteries shown in FIGS. 1 and 2 were fabricated. First, lithium carbonate ($Li_2CO_3$) and cobalt carbonate ($CoCO_3$) were mixed at the mol ratio of $Li_2CO_3:CoCO_3=0.5:1$. The resultant mixture was fired for 5 hours at 900 deg C. in the air to obtain lithium cobalt complex oxide ($LiCoO_2$). When X-ray diffraction was performed for the obtained $LiCoO_2$, the result well corresponded with the peak of $LiCOO_2$ registered in the JCPDS (Joint Committee of Powder Diffraction Standard) file. Next, the lithium cobalt complex oxide was pulverized to obtain powder in which the accumulated 50% particle diameter obtained by laser diffraction method was 15 µm as a cathode active material.

Subsequently, 95 wt % of the lithium cobalt complex oxide powder, 5 wt % of lithium carbonate ($Li_2Co_3$) powder were mixed. Then, 94 wt % of the resultant mixture, 3 wt % of Ketjen black as an electrical conductor, and 3 wt % of polyvinylidene fluoride as a binder were mixed. The resultant mixture was dispersed in N-methyl 2-pyrrolidone as a solvent to obtain cathode mixture slurry. Next, the both faces of the cathode current collector 21A made of a strip-shaped aluminum foil being 20 µm thick were uniformly coated with the cathode mixture slurry, which was dried and compression-molded to form the cathode active material layer 21B and thereby forming the cathode 21. Then, the thickness on one face of the cathode active material layer 21B was 102 µm, and the volume density was 3.53 $g/cm^3$. After that, the cathode lead 25 made of aluminum was attached to one end of the cathode current collector 21A.

Further, 90 wt % of granular graphite powder with the average particle diameter of 25 µm as an anode active material and 10 wt % of polyvinylidene fluoride as a binder were mixed. The resultant mixture was dispersed in N-methyl-2-pyrrolidone as a solvent to obtain anode mixture slurry. The graphite property used as an anode active material was as follows. That is, the lattice spacing $d_{002}$ in the C-axis direction calculated by X-ray diffraction was 0.3363 nm, the peak intensity ratio $I_D/I_G$ obtained by the Raman spectrum using argon laser light with the wavelength of 514.5 nm was 0.3, the bulk density was 1.50 $g/cm^3$, and the breaking strength was 72 MPa. The breaking strength was measured by the micro compression testing machine MCT-W500 of Simadzu Corporation, and obtained from Mathematical formula 1.

Next, the both faces of the anode current collector 22A made of a strip-shaped copper foil being 15 µm thick were uniformly coated with the anode mixture slurry, which was dried and compression-molded to form the anode active material layer 22B and form the anode 22. Then, the thickness of one face of the anode active material layer 22B was 90 μm, and the volume density was 1.80 g/cm³. Subsequently, the anode lead 26 made of nickel was attached to one end of the anode current collector 22A.

After the cathode 21 and the anode 22 were respectively formed, the cathode 21 and the anode 22 were layered with the separator 23 made of a micro porous polyethylene drawn film being 25 μm thick in between. Then the anode 22, the separator 23, the cathode 21, and the separator 23 were layered in this order, and the resultant lamination was spirally wound many times to form the jelly roll-shaped spirally wound electrode body 20. Next, the spirally wound electrode body 20 was sandwiched between the pair of insulating plates 12 and 13. The anode lead 26 was welded to the battery can 11, the cathode lead 25 was welded to the safety valve mechanism 15, and the spirally wound electrode body 20 was contained in the battery can 11. Subsequently, an electrolytic solution was injected into the battery can 11, the battery cover 14 and the battery can 11 were caulked with the gasket 17, and thereby the cylinder type secondary battery was fabricated.

For the electrolytic solution, an electrolytic solution obtained by dissolving lithium hexafluorophosphate as an electrolyte salt in a mixed solvent of 4-fluoro-1,3-dioxolane-2-one (FEC), ethylene carbonate (EC), diethyl carbonate (DEC), propylene carbonate (PC), and ethylene sulfide (ES) at the ratio shown in Table 1 so that lithium hexafluorophosphate became 1 mol/kg was used. Then, the content of 4-fluoro-1,3-dioxolane-2-one in the solvent was changed within the range from 0.08 wt % to 31 wt %.

As Comparative example 1-1 relative to Examples 1-1 to 1-7, a secondary battery was fabricated as in Examples 1-1 to 1-7, except that 4-fluoro-1,3-dioxolane-2-one was not mixed in the electrolytic solution. As Comparative example 1-2, a secondary battery was fabricated as in Examples 1-1 to 1-7, except that 4-butyl-4,5,5-fluoro-1,3-dioxolane-2-one was mixed in the electrolytic solution instead of 4-fluoro-1,3-dioxolane-2-one.

Further, as Comparative examples 1-3 to 1-6, secondary batteries were fabricated as in Examples 1-1 to 1-7, except that the thickness of one face of the cathode active material layer was 75 μm and the thickness of one face of the anode active material layer was 67 μm, and the content of 4-fluoro-1,3-dioxolane-2-one in the solvent of the electrolytic solution was changed as shown in Table 2.

For the fabricated secondary batteries of Examples 1-1 to 1-7 and Comparative examples 1-1 to 1-6, charge and discharge were performed, and the battery capacity, the initial charge and discharge efficiency, and the cycle characteristics were measured. At that time, charge was performed as follows. After charge was performed at the constant current of 1 C until the battery voltage reached 4.2 V, charge was performed at the constant voltage of 4.2 V until the total charge time reached 4 hours. Discharge was performed at the constant current of 1200 mA until the battery voltage reached 3.0 V. 1 C represents the current value with which the theoretical capacity can be fully discharged in 1 hour. The battery capacity was the initial discharge capacity (discharge capacity at the first cycle). The initial charge and discharge efficiency was the ratio of the discharge capacity at the first cycle to the charge capacity at the first cycle, that is, (discharge capacity at the first cycle/charge capacity at the first cycle)×100(%). The cycle characteristics were obtained as the discharge capacity ratio at the 100th cycle to the initial discharge capacity (discharge capacity at the first cycle), that is, (discharge capacity at the 100th cycle/discharge capacity at the first cycle)× 100(%). The results are shown in Tables 1 and 2. The battery capacity is expressed as a relative value where the value of Comparative example 1-1 is 100.

TABLE 1

Cathode active material layer: thickness: 102 μm, volume density: 3.53 g/cm³
Anode active material layer: thickness: 90 μm, volume density: 1.80 g/cm³

| | Compositition of solvent (wt %) | | | | | | LiPF$_6$ (mol/kg) | Battery capacity (relative value) | Initial charge and discharge efficiency (%) | Cycle characteristics (%) |
|---|---|---|---|---|---|---|---|---|---|---|
| | FEC | DEC | EC | BTFEC | PC | ES | | | | |
| Example 1-1 | 0.08 | 47.96 | 47.96 | 0 | 4 | 1 | 1 | 100 | 94.3 | 66 |
| Example 1-2 | 0.1 | 47.45 | 47.45 | 0 | 4 | 1 | 1 | 100 | 94.5 | 80 |
| Example 1-3 | 1 | 47 | 47 | 0 | 4 | 1 | 1 | 100 | 94.9 | 86 |
| Example 1-4 | 4 | 45.5 | 45.5 | 0 | 4 | 1 | 1 | 100 | 95 | 89 |
| Example 1-5 | 10 | 42.5 | 42.5 | 0 | 4 | 1 | 1 | 100 | 95.2 | 91 |
| Example 1-6 | 30 | 32.5 | 32.5 | 0 | 4 | 1 | 1 | 100 | 94.6 | 80 |
| Example 1-7 | 31 | 32 | 32 | 0 | 4 | 1 | 1 | 100 | 94.4 | 69 |
| Comparative example 1-1 | 0 | 47.5 | 47.5 | 0 | 4 | 1 | 1 | 100 | 94.1 | 32 |
| Comparative example 1-2 | 0 | 45.5 | 45.5 | 4 | 4 | 1 | 1 | 100 | 94 | 31 |

TABLE 2

Cathode active material layer: thickness: 75 μm, volume density: 3.53 g/cm³
Anode active material layer: thickness: 67 μm, volume density: 1.80 g/cm³

|  | Composition of solvent (wt %) | | | | | | LiPF₆ (mol/kg) | Battery capacity (relative value) | Initial charge and discharge efficiency (%) | Cycle characteristics (%) |
| --- | --- | --- | --- | --- | --- | --- | --- | --- | --- | --- |
|  | FEC | DEC | EC | BTFEC | PC | ES |  |  |  |  |
| Comparative example 1-3 | 0 | 47.5 | 47.5 | 0 | 4 | 1 | 1 | 94 | 94 | 90 |
| Comparative example 1-4 | 1 | 47 | 47 | 0 | 4 | 1 | 1 | 94 | 95.1 | 89 |
| Comparative example 1-5 | 4 | 45.5 | 45.5 | 0 | 4 | 1 | 1 | 94 | 95.1 | 91 |
| Comparative example 1-6 | 10 | 42.5 | 42.5 | 0 | 4 | 1 | 1 | 94 | 95.2 | 89 |

As shown in Table 1, in Examples 1-1 to 1-7 and Comparative examples 1-1 and 1-2 in which the thicknesses of the cathode active material layer 21B and the anode active material layer 22B were increased, the initial charge and discharge efficiency and the cycle characteristics could be improved in Examples 1-1 to 1-7 in which 4-fluoro-1,3-dioxolane-2-one was added more than those in Comparative examples 1-1 and 1-2 in which 4-fluoro-1,3-dioxolane-2-one was not added. In particular, the cycle characteristics thereof were enormously improved. Meanwhile, as shown in Table 2, in Comparative examples 1-3 to 1-6 in which the thicknesses of the cathode active material layer and the anode active material layer were decreased, in the case where 4-fluoro-1,3-dioxolane-2-one was added, although the initial charge and discharge efficiency was improved, the cycle characteristics were not improved.

That is, it was found that when 4-fluoro-1,3-dioxolane-2-one was contained in the electrolytic solution, superior cycle characteristics could be obtained even if the thickness of the anode active material layer 22B was increased and the volume density was increased.

Further, there was a tendency that when the content of 4-fluoro-1,3-dioxolane-2-one in the solvent was increased, the cycle characteristics were improved, and then deteriorated. That is, it was found that the content of 4-fluoro-1,3-dioxolane-2-one in the solvent was preferably in the range from 0.1 wt % to 30 wt %.

Examples 2-1 and 2-2

Secondary batteries were fabricated as in Example 1-4, except that the thicknesses of one face of the cathode active material layer 21B and one face of the anode active material layer 22B were changed as shown in Table 3. Specifically, in Example 2-1, the thickness of one face of the cathode active material layer 21B was 100 μm and the thickness of one face of the anode active material layer 22B was 85 μm. In Example 2-2, the thickness of one face of the cathode active material layer 21B was 130 μm and the thickness of one face of the anode active material layer 22B was 120 μm.

As Comparative examples 2-1 to 2-3 relative to Examples 2-1 and 2-2, secondary batteries were fabricated as in Example 1-4, except that the thicknesses of one face of the cathode active material layer and one face of the anode active material layer were changed as shown in Table 3. Specifically, in Comparative example 2-1, the thickness of one face of the cathode active material layer was 75 μm and the thickness of one face of the anode active material layer was 67 μm. In Comparative example 2-2, the thickness of one face of the cathode active material layer was 95 μm and the thickness of one face of the anode active material layer was 80 μm. In Comparative example 2-3, the thickness of one face of the cathode active material layer was 135 μm and the thickness of one face of the anode active material layer was 125 μm.

Further, as Comparative examples 2-4 to 2-8, secondary batteries were fabricated as in Example 1-4, except that the thicknesses of one face of the cathode active material layer and one face of the anode active material layer were changed as shown in Table 3, and 4-fluoro-1,3-dioxolane-2-one was not added to the electrolytic solution. The thicknesses of the cathode active material layer and the anode active material layer were as follows. The thicknesses of Comparative example 2-4 were identical with those of Comparative example 2-1. The thicknesses of Comparative example 2-5 were identical with those of Comparative example 2-2. The thicknesses of Comparative example 2-6 were identical with those of Example 2-1. The thicknesses of Comparative example 2-7 were identical with those of Example 2-2. The thicknesses of Comparative example 2-8 were identical with those of Comparative example 2-3.

For the fabricated secondary batteries of Examples 2-1, 2-2 and Comparative examples 2-1 to 2-8, the battery capacity, the initial charge and discharge efficiency, and the cycle characteristics were examined as in Example 1-4. The results are shown in Table 3 together with the results of Example 1-4 and Comparative example 1-1. The battery capacity is shown as a relative value where the value of Comparative example 1-1 is 100.

TABLE 3

| | Composition of solvent (wt %) | | | | | LiPF$_6$ (mol/kg) | Cathode active material layer | | Anode active material layer | | Battery capacity (relative value) | Initial charge/ discharge efficiency (%) | Cycle Characteristics. (%) |
|---|---|---|---|---|---|---|---|---|---|---|---|---|---|
| | FEC | DEC | EC | PC | ES | | Thick. (μm) | Vol. den. (g/cm$^3$) | Thick. (μm) | Vol. den. (g/cm$^3$) | | | |
| Ex. 2-1 | 4 | 45.5 | 45.5 | 4 | 1 | 1 | 100 | 3.53 | 85 | 1.8 | 98 | 95.1 | 90 |
| Ex. 1-4 | 4 | 45.5 | 45.5 | 4 | 1 | 1 | 102 | 3.53 | 90 | 1.8 | 100 | 95 | 89 |
| Ex. 2-2 | 4 | 45.5 | 45.5 | 4 | 1 | 1 | 130 | 3.53 | 120 | 1.8 | 107 | 95.1 | 84 |
| Comp. ex. 2-1 | 4 | 45.5 | 45.5 | 4 | 1 | 1 | 75 | 3.53 | 67 | 1.8 | 94 | 95.1 | 91 |
| Comp. ex. 2-2 | 4 | 45.5 | 45.5 | 4 | 1 | 1 | 95 | 3.53 | 80 | 1.8 | 97 | 95.2 | 90 |
| Comp. ex. 2-3 | 4 | 45.5 | 45.5 | 4 | 1 | 1 | 135 | 3.53 | 125 | 1.8 | 109 | 95.2 | 65 |
| Comp. ex. 2-4 | 0 | 47.5 | 47.5 | 4 | 1 | 1 | 75 | 3.53 | 67 | 1.8 | 94 | 94.1 | 90 |
| Comp. ex. 2-5 | 0 | 47.5 | 47.5 | 4 | 1 | 1 | 95 | 3.53 | 80 | 1.8 | 97 | 94 | 88 |
| Comp. ex. 2-6 | 0 | 47.5 | 47.5 | 4 | 1 | 1 | 100 | 3.53 | 85 | 1.8 | 98 | 94 | 39 |
| Comp. ex. 1-1 | 0 | 47.5 | 47.5 | 4 | 1 | 1 | 102 | 3.53 | 90 | 1.8 | 100 | 94.1 | 32 |
| Comp. ex. 2-7 | 0 | 47.5 | 47.5 | 4 | 1 | 1 | 130 | 3.53 | 120 | 1.8 | 107 | 94.2 | 29 |
| Comp. ex. 2-8 | 0 | 47.5 | 47.5 | 4 | 1 | 1 | 135 | 3.53 | 125 | 1.8 | 109 | 94 | 27 |

As shown in Table 3, in Examples 1-4, 2-1, 2-2 and Comparative examples 1-1, 2-6, 2-7 in which the thickness of the cathode active material layer 21B was from 100 μm to 130 μm and the thickness of the anode active material layer 22B was from 85 μm to 120 μm, the cycle characteristics could be largely improved by adding 4-fluoro-1,3-dioxolane-2-one. Meanwhile, in Comparative examples 2-1, 2-2, 2-4, and 2-5 in which the thickness of the cathode active material layer was thinner than 100 μm and the thickness of the anode active material layer was thinner than 85 μm, the cycle characteristics were improved slightly by adding 4-fluoro-1,3-dioxolane-2-one, and the battery capacity was low. In Comparative examples 2-3 and 2-8 in which the thickness of the cathode active material layer was thicker than 130 μm and the thickness of the anode active material layer was thicker than 120 μm, the cycle characteristics were improved by adding 4-fluoro-1,3-dioxolane-2-one, but the improvement degree was not sufficient.

That is, it was found that when 4-fluoro-1,3-dioxolane-2-one was contained in the electrolytic solution in the case that the thickness of the cathode active material layer 21B was in the range from 100 μm to 130 μm and the thickness of the anode active material layer 22B was in the range from 85 μm to 120 μm, the cycle characteristics could be largely improved and high effects could be obtained.

Examples 3-1 and 3-2

Secondary batteries were fabricated as in Example 1-4, except that the volume density of the anode active material layer 22B was changed to 1.7 g/cm$^3$ or 1.85 g/cm$^3$ as shown in Table 4.

As Comparative examples 3-1 and 3-2 relative to Examples 3-1 and 3-2, secondary batteries were fabricated as in Example 1-4, except that the volume density of the anode active material layer was changed to 1.65 g/cm$^3$ or 1.9 g/cm$^3$ as shown in Table 4. Further, as Comparative examples 3-3 to 3-6, secondary batteries were fabricated as in Example 1-4, except that the volume density of the anode active material layer was changed as shown in Table 4, and 4-fluoro-1,3-dioxolane-2-one was not added to the electrolytic solution. The volume density of the anode active material layer was as follows. The volume density of the anode active material layer of Comparative example 3-3 was identical with that of Comparative example 3-1. The volume density of the anode active material layer of Comparative example 3-4 was identical with that of Example 3-1. The volume density of the anode active material layer of Comparative example 3-5 was identical with that of Example 3-2. The volume density of the anode active material layer of Comparative example 3-6 was identical with that of Comparative example 3-2.

For the fabricated secondary batteries of Examples 3-1, 3-2 and Comparative examples 3-1 to 3-6, the cycle characteristics were examined as in Example 1-4. The results are shown in Table 4 together with the results of Example 1-4 and Comparative example 1-1.

TABLE 4

| | Composition of solvent (wt %) | | | | | LiPf₆ (mol/kg) | Cathode active material layer | | Anode active material layer | | Cycle Characteristics |
|---|---|---|---|---|---|---|---|---|---|---|---|
| | FEC | DEC | EC | PC | ES | | Thick. (μm) | Vol. den. (g/cm³) | Thick. (μm) | Vol. den. (g/cm³) | (%) |
| Ex. 3-1 | 4 | 45.5 | 45.5 | 4 | 1 | 1 | 102 | 3.53 | 90 | 1.7 | 91 |
| Ex. 1-4 | 4 | 45.5 | 45.5 | 4 | 1 | 1 | 102 | 3.53 | 90 | 1.8 | 89 |
| Ex. 3-2 | 4 | 45.5 | 45.5 | 4 | 1 | 1 | 102 | 3.53 | 90 | 1.85 | 90 |
| Comp. Ex. 3-1 | 4 | 45.5 | 45.5 | 4 | 1 | 1 | 102 | 3.53 | 90 | 1.65 | 92 |
| Comp. Ex. 3-2 | 4 | 45.5 | 45.5 | 4 | 1 | 1 | 102 | 3.53 | 90 | 1.9 | 35 |
| Comp. Ex. 3-3 | 0 | 47.5 | 47.5 | 4 | 1 | 1 | 102 | 3.53 | 90 | 1.65 | 91 |
| Comp. Ex. 3-4 | 0 | 47.5 | 47.5 | 4 | 1 | 1 | 102 | 3.53 | 90 | 1.7 | 34 |
| Comp. Ex. 1-1 | 0 | 47.5 | 47.5 | 4 | 1 | 1 | 102 | 3.53 | 90 | 1.8 | 32 |
| Comp. Ex. 3-5 | 0 | 47.5 | 47.5 | 4 | 1 | 1 | 102 | 3.53 | 90 | 1.85 | 30 |
| Comp. Ex. 3-6 | 0 | 47.5 | 47.5 | 4 | 1 | 1 | 102 | 3.53 | 90 | 1.9 | 32 |

As shown in Table 4, in Examples 1-4, 3-1, 3-2 and Comparative examples 1-1, 3-4, 3-5 in which the volume density of the anode active material layer 22B was from 1.7 g/cm³ to 1.85 g/cm³, the cycle characteristics could be largely improved by adding 4-fluoro-1,3-dioxolane-2-one. Meanwhile, in Comparative examples 3-1 and 3-3 in which the volume density of the anode active material layer was smaller than 1.7 g/cm³ and in Comparative examples 3-2 and 3-6 in which the volume density of the anode active material layer was larger than 1.85 g/cm³, the cycle characteristics were slightly improved by adding 4-fluoro-1,3-dioxolane-2-one.

That is, it was found that when 4-fluoro-1,3-dioxolane-2-one was contained in the electrolytic solution in the case that the volume density of the anode active material layer 22B was in the range from 1.7 g/cm³ to 1.85 g/cm³, the cycle characteristics could be largely improved and high effects could be obtained.

Examples 4-1 to 4-5

Secondary batteries were fabricated as in Examples 1-1 to 1-7, except that the specific surface area B (m²/g) of graphite used as an anode active material and the content A (wt %) of 4-fluoro-1,3-dioxolane-2-one in the solvent of the electrolytic solution were changed as shown in Table 5.

As Comparative examples 4-1 and 4-2 relative to Examples 4-1 to 4-5, secondary batteries were fabricated as in Examples 4-1 to 4-5, except that graphite with the specific surface area shown in Table 5 was used as an anode active material and 4-fluoro-1,3-dioxolane-2-one was not added to the electrolytic solution.

For the fabricated secondary batteries of Examples 4-1 to 4-5 and Comparative examples 4-1 and 4-2, the initial charge and discharge efficiency and the cycle characteristics were examined as in Examples 1-1 to 1-7. The cycle characteristics were obtained as the discharge capacity ratio at the 300th cycle to the initial discharge capacity (discharge capacity at the first cycle), that is, (discharge capacity at the 300th cycle/discharge capacity at the first cycle)×100(%). The results are shown in Table 5.

TABLE 5

Cathode active material layer: thickness 102 μm, volume density: 3.53 g/cm³
Anode active material layer: thickness: 90 μm, volume density: 1.80 g/cm³

| | Composition of solvent (wt %) | | | | | LiPF₆ | Anode graphite specific surface area B | Graphite specific surface area B/FEC | Initial charge and discharge efficiency | Cycle characteristics |
|---|---|---|---|---|---|---|---|---|---|---|
| | FEC | DEC | EC | PC | ES | (mol/kg) | (m²/g) | content A | (%) | (%) |
| Example 4-1 | 0.5 | 47.25 | 47.25 | 4 | 1 | 1 | 0.65 | 1.30 | 94.9 | 80 |
| Example 4-2 | 20 | 37.5 | 37.5 | 4 | 1 | 1 | 8.22 | 0.41 | 91.1 | 81 |
| Example 4-3 | 5 | 45.0 | 45.0 | 4 | 1 | 1 | 0.65 | 0.13 | 95.0 | 81 |
| Example 4-4 | 20 | 37.5 | 37.5 | 4 | 1 | 1 | 0.65 | 0.03 | 95.2 | 85 |
| Example 4-5 | 30 | 32.5 | 32.5 | 4 | 1 | 1 | 0.65 | 0.02 | 95.1 | 86 |
| Comparative example 4-1 | 0 | 47.5 | 47.5 | 4 | 1 | 1 | 0.65 | — | 94.1 | 74 |
| Comparative example 4-2 | 0 | 47.5 | 47.5 | 4 | 1 | 1 | 8.22 | — | 90.1 | 71 |

As shown in Table 5, the cycle characteristics could be improved according to all of Examples 4-1 to 4-5. That is, it was found that the ratio B/A of the specific surface area B ($m^2/g$) of the carbon material in the anode 22 to the content A (wt %) of 4-fluoro-1,3-dioxolane-2-one in the solvent was in the range from 0.02 to 1.3, higher effects could be obtained.

Examples 5-1 and 5-2

Secondary batteries were fabricated as in Example 4-3, except that the content of lithium hexafluorophosphate in the electrolytic solution was 0.5 mol/kg or 2 mol/kg as shown in Table 6.

For the fabricated secondary batteries of Examples 5-1 and 5-2, the initial charge and discharge efficiency and the cycle characteristics were examined as in Example 4-3. The cycle characteristics were the discharge capacity ratio at the 300th cycle. The results are shown in Table 6 together with the results of Example 4-3 and Comparative example 4-1.

Examples 6-1 and 6-2

Secondary batteries as Examples 6-1 and 6-2 were fabricated as in Examples 1-1 to 1-7, except that the composition of the solvent of the electrolytic solution was set as shown in the following Table 7 by using ethyl methyl carbonate (MEC) instead of ethylene sulfide (ES) and by further adding vinylene carbonate (VC). Further, as Comparative examples 6-1 and 6-2 relative to Examples 6-1 and 6-2, secondary batteries were fabricated as in Examples 6-1 and 6-2, except that 4-fluoro-1,3-dioxolane-2-one was not added to the electrolytic solution. In Example 6-1 and Comparative example 6-1, vinylene carbonate was contained in the solvent. The specific surface area B ($m^2/g$) of the anode graphite to the content A (wt %) of 4-fluoro-1,3-dioxolane-2-one in the sol-

TABLE 6

Cathode active material layer: thickness: 102 μm, volume density: 3.53 g/cm³
Anode active material layer: thickness: 90 μm, volume density: 1.80 g/cm³

| | Composition of solvent (wt %) | | | | | LiPF$_6$ | Anode graphite specific surface area B | Graphite specific surface area B/FEC | Initial charge and discharge efficiency | Cycle characteristics |
|---|---|---|---|---|---|---|---|---|---|---|
| | FEC | DEC | EC | PC | ES | (mol/kg) | ($m^2/g$) | content A | (%) | (%) |
| Example 5-1 | 5 | 45.0 | 45.0 | 4 | 1 | 0.5 | 0.65 | 0.13 | 94.9 | 78 |
| Example 4-3 | 5 | 45.0 | 45.0 | 4 | 1 | 1 | 0.65 | 0.13 | 95.0 | 81 |
| Example 5-2 | 5 | 45.0 | 45.0 | 4 | 1 | 2 | 0.65 | 0.13 | 94.8 | 77 |
| Comparative example 4-1 | 0 | 45.0 | 47.5 | 4 | 1 | 1 | 0.65 | — | 94.1 | 74 |

As shown in Table 6, there was a tendency that when the content of lithium hexafluorophosphate in the electrolytic solution was increased, the cycle characteristics were improved and then decreased. That is, it was found that the content of lithium hexafluorophosphate was in the range from 0.5 mol/kg to 2 mol/kg, higher effects could be obtained.

vent is also shown as B/A. The specific surface area B of the anode graphite was 0.8 ($m^2/g$) for the all cases.

For the fabricated secondary batteries of Examples 6-1, 6-2 and Comparative examples 6-1, 6-2, the cycle characteristics were examined as in Examples 1-1 to 1-7. The cycle characteristics were obtained as the discharge capacity ratio at the 500th cycle to the initial discharge capacity (discharge capacity at the first cycle), that is, (discharge capacity at the 500th cycle/discharge capacity at the first cycle)×100(%). The obtained results are shown in Table 7.

TABLE 7

Cathode active material layer: thickness: 102 μm, volume density: 3.53 g/cm³
Anode active material layer: thickness: 90 μm, volume density: 1.80 g/cm³

| | Wt ratio of FEC: VC | Composition of solvent (wt %) | | | | | | LiPF$_6$ (mol/kg) | Anode graphite specific surface area B (m²/g) | B/A | Cycle characteristics (%) |
|---|---|---|---|---|---|---|---|---|---|---|---|
| | | FEC | DEC | EC | VC | PC | MEC | | | | |
| Example 6-1 | 1:0.1 | 10 | 37.5 | 37.5 | 1 | 4 | 10 | 1 | 0.8 | 0.08 | 96 |
| Example 6-2 | — | 10 | 38 | 38 | 0 | 4 | 10 | 1 | 0.8 | 0.08 | 68 |
| Comparative example 6-1 | — | 0 | 42.5 | 42.5 | 1 | 4 | 10 | 1 | 0.8 | — | 53 |
| Comparative example 6-2 | — | 0 | 43 | 43 | 0 | 4 | 10 | 1 | 0.8 | — | 25 |

As shown in Table 7, the cycle characteristics could be further improved by adding vinylene carbonate to the solvent containing 4-fluoro-1,3-dioxolane-2-one. That is, it was found that when 4-fluoro-1,3-dioxolane-2-one and vinylene carbonate were used together, the extremely dense and favorable coating was formed and thus more superior cycle characteristics could be obtained.

Examples 7-1 to 7-6

Secondary batteries were fabricated as in Examples 6-1 and 6-2, except that the content of 4-fluoro-1,3-dioxolane-2-one in the solvent was changed as shown in the following Table 8.

For the fabricated secondary batteries of Examples 7-1 to 7-6, the initial charge and discharge efficiency and the cycle characteristics were examined as in Example 6-1. The cycle characteristics were the discharge capacity ratio at the 500th cycle to the initial discharge capacity. The obtained results are shown in Table 8 together with the results of Example 6-1 and Comparative example 6-1. The specific surface area B of the anode graphite was 0.8 (m²/g) for the all cases.

TABLE 8

Cathode active material layer: thickness: 102 μm, volume density: 3.53 g/cm³
Anode active material layer: thickness: 90 μm, volume density: 1.80 g/cm³

| | Wt ratio of FEC:VC | Composition of solvent (wt %) | | | | | | LiPF$_6$ (mol/kg) | Anode graphite specific surface area B (m²/g) | B/A | Cycle characteristics (%) |
|---|---|---|---|---|---|---|---|---|---|---|---|
| | | FEC | DEC | EC | VC | PC | MEC | | | | |
| Example 7-1 | 1:20 | 0.05 | 42.475 | 42.475 | 1 | 4 | 10 | 1 | 0.8 | 16 | 78 |
| Example 7-2 | 1:10 | 0.1 | 42.45 | 42.45 | 1 | 4 | 10 | 1 | 0.8 | 8 | 88 |
| Example 7-3 | 1:0.2 | 5 | 40 | 40 | 1 | 4 | 10 | 1 | 0.8 | 0.16 | 94 |
| Example 6-1 | 1:0.1 | 10 | 37.5 | 37.5 | 1 | 4 | 10 | 1 | 0.8 | 0.08 | 96 |
| Example 7-4 | 1:0.05 | 20 | 32.5 | 32.5 | 1 | 4 | 10 | 1 | 0.8 | 0.04 | 91 |
| Example 7-5 | 1:0.033 | 30 | 27.5 | 27.5 | 1 | 4 | 10 | 1 | 0.8 | 0.03 | 75 |
| Example 7-6 | 1:0.025 | 40 | 22.5 | 22.5 | 1 | 4 | 10 | 1 | 0.8 | 0.02 | 64 |
| Comparative example 6-1 | — | 0 | 42.5 | 42.5 | 1 | 4 | 10 | 1 | 0.8 | — | 53 |

As shown in Table 8, it was found that when the solvent contains vinylene carbonate, in the case that the content of 4-fluoro-1,3-dioxolane-2-one was in the range from 0.1 wt % to 20 wt % of the whole solvent, superior cycle characteristics could be obtained.

Examples 8-1 to 8-6

Secondary batteries were fabricated as in Examples 6-1 and 6-2, except that the content of vinylene carbonate in the solvent was changed as shown in the following Table 9.

For the fabricated secondary batteries of Examples 8-1 to 8-6, the initial charge and discharge efficiency and the cycle characteristics were examined as in Example 6-1. The cycle characteristics were the discharge capacity ratio at the 500th cycle to the initial discharge capacity. The obtained results are shown in Table 9 together with the results of Examples 6-1, 6-2, and 7-4. The specific surface area B of the anode graphite was 0.8 ($m^2$/g) for the all cases.

TABLE 9

Cathode active material layer: thickness: 102 μm, volume density: 3.53 g/$cm^3$
Anode active material layer: thickness: 90 μm, volume density: 1.80 g/$cm^3$

| | Wt ratio of | Composition of solvent (wt %) | | | | | | $LiPF_6$ | Anode graphite specific surface area B | | Cycle characteristics |
|---|---|---|---|---|---|---|---|---|---|---|---|
| | FEC:VC | FEC | DEC | EC | VC | PC | MEC | (mol/kg) | ($m^2$/g) | B/A | (%) |
| Example 6-2 | — | 10 | 38 | 38 | 0 | 4 | 10 | 1 | 0.8 | 0.08 | 68 |
| Example 8-1 | 1:0.005 | 10 | 37.975 | 37.975 | 0.05 | 4 | 10 | 1 | 0.8 | 0.08 | 78 |
| Example 8-2 | 1:0.01 | 10 | 37.95 | 37.95 | 0.1 | 4 | 10 | 1 | 0.8 | 0.08 | 82 |
| Example 8-3 | 1:0.02 | 10 | 37.9 | 37.9 | 0.2 | 4 | 10 | 1 | 0.8 | 0.08 | 91 |
| Example 7-4 | 1:0.05 | 20 | 32.5 | 32.5 | 1 | 4 | 10 | 1 | 0.8 | 0.04 | 91 |
| Example 6-1 | 1:0.1 | 10 | 37.5 | 37.5 | 1 | 4 | 10 | 1 | 0.8 | 0.08 | 96 |
| Example 8-4 | 1:0.2 | 10 | 37 | 37 | 2 | 4 | 10 | 1 | 0.8 | 0.08 | 92 |
| Example 8-5 | 1:0.5 | 10 | 35.5 | 35.5 | 5 | 4 | 10 | 1 | 0.8 | 0.08 | 90 |
| Example 8-6 | 1:0.6 | 10 | 35 | 35 | 6 | 4 | 10 | 1 | 0.8 | 0.08 | 70 |

As shown in Table 9, it was found that when the content of vinylene carbonate in the solvent was in the range from 0.2 wt % to 5 wt %, more superior cycle characteristics could be obtained.

Examples 9-1 to 9-8

Secondary batteries were fabricated as in Examples 6-1 and 6-2, except that the specific surface area B ($m^2/g$) of graphite used as an anode active material and the content A (wt %) of 4-fluoro-1,3-dioxolane-2-one in the solvent were set as shown in the following Table 10.

For the fabricated secondary batteries of Examples 9-1 to 9-8, the initial charge and discharge efficiency and the cycle characteristics were examined as in Example 6-1. The cycle characteristics were the discharge capacity ratio at the 500th cycle to the initial discharge capacity. The obtained results are shown in Table 10 together with the results of the Examples 6-1 and 7-1 to 7-4.

TABLE 10

Cathode active material layer: thickness: 102 μm, volume density: 3.53 g/cm³
Anode active material layer: thickness: 90 μm, volume density: 1.80 g/cm³

| | Wt ratio of FEC:VC | Composition of solvent (wt %) | | | | | | $LiPF_6$ (mol/kg) | Anode graphite specific surface area B ($m^2/g$) | B/A | Cycle characteristics (%) |
|---|---|---|---|---|---|---|---|---|---|---|---|
| | | FEC | DEC | EC | VC | PC | MEC | | | | |
| Example 9-1 | 1:0.053 | 19 | 33 | 33 | 1 | 4 | 10 | 1 | 0.19 | 0.01 | 84 |
| Example 9-2 | 1:0.105 | 9.5 | 37.75 | 37.75 | 1 | 4 | 10 | 1 | 0.19 | 0.02 | 91 |
| Example 7-4 | 1:0.05 | 20 | 32.5 | 32.5 | 1 | 4 | 10 | 1 | 0.8 | 0.04 | 91 |
| Example 6-1 | 1:0.1 | 10 | 37.5 | 37.5 | 1 | 4 | 10 | 1 | 0.8 | 0.08 | 96 |
| Example 7-3 | 1:0.2 | 5 | 40 | 40 | 1 | 4 | 10 | 1 | 0.8 | 0.16 | 94 |
| Example 9-3 | 1:0.078 | 12.8 | 36.1 | 36.1 | 1 | 4 | 10 | 1 | 4.21 | 0.33 | 92 |
| Example 9-4 | 1:0.46 | 2.15 | 41.425 | 41.425 | 1 | 4 | 10 | 1 | 1.12 | 0.52 | 94 |
| Example 9-5 | 1:3.44 | 0.29 | 42.355 | 42.355 | 1 | 4 | 10 | 1 | 0.19 | 0.65 | 95 |
| Example 9-6 | 1:6.67 | 0.15 | 42.425 | 42.425 | 1 | 4 | 10 | 1 | 0.19 | 1.3 | 90 |
| Example 9-7 | 1:8.33 | 0.12 | 42.44 | 42.44 | 1 | 4 | 10 | 1 | 0.19 | 1.56 | 83 |
| Example 9-8 | 1:27.8 | 0.036 | 42.482 | 42.482 | 1 | 4 | 10 | 1 | 0.19 | 5.3 | 79 |
| Example 7-2 | 1:10 | 0.1 | 42.45 | 42.45 | 1 | 4 | 10 | 1 | 0.8 | 8 | 88 |
| Example 7-1 | 1:20 | 0.05 | 42.475 | 42.475 | 1 | 4 | 10 | 1 | 0.8 | 16 | 78 |

As shown in Table 10, it was found that in the case that the content of 4-fluoro-1,3-dioxolane-2-one was in the range from 0.1 wt % to 20 wt % to the whole solvent and the content of vinylene carbonate was in the range from 0.2 wt % to 5 wt %, and concurrently the ratio B/A of the specific surface area B ($m^2/g$) of the anode carbon to the content A (wt %) of 4-fluoro-1,3-dioxolane-2-one in the solvent was from 0.02 to 1.3, more superior cycle characteristics could be obtained.

Further, from the results of Table 8 to Table 10, it was found that when the content of 4-fluoro-1,3-dioxolane-2-one in the solvent was in the range from 0.1 wt % to 20 wt % to the whole solvent and the weight ratio of vinylene carbonate to 4-fluoro-1,3-dioxolane-2-one was in the range from 0.02 to 10, more superior cycle characteristics could be obtained. That is, it was confirmed that to form a favorable coating on the surface of the anode active material, there was the optimal mixture ratio between 4-fluoro-1,3-dioxolane-2-one and vinylene carbonate.

The invention has been described with reference to the embodiment and the examples. However, the invention is not limited to the embodiment and the examples, and various modifications may be made. For example, in the foregoing embodiment and the foregoing examples, descriptions have been given of the battery using lithium as an electrode reactant. However, the invention can be applied to the case using other alkali metal such as sodium (Na) and potassium (K), an alkali earth metal such as magnesium and calcium (Ca), or other light metal such as aluminum. At this time, the cathode active material or the like capable of inserting and extracting the electrode reactant is selected according to the electrode reactant.

Further, in the foregoing embodiment and the foregoing examples, descriptions have been given of the cylinder type secondary battery having the spirally winding structure. However, the invention can be similarly applied to an oval type or polygonal type secondary battery having a spirally winding structure, an other-shaped secondary battery in which the cathode and the anode are folded, or an other-shaped secondary battery in which a plurality of cathodes and a plurality of anodes are layered. In addition, the invention can be applied to an other-shaped secondary battery such as a coin type battery, a button type battery, a square type battery, and a laminated type battery.

Further, in the foregoing embodiment and the foregoing examples, descriptions have been given of the case using the liquid electrolytic solution as an electrolyte. However, a gelatinous electrolyte obtained by holding an electrolytic solution in a holding body such as a polymer may be used. As such a polymer, for example, polyacrylonitrile, polyvinylidene fluoride, a copolymer of vinylidene fluoride and hexafluoropropylene, polytetrafluoro ethylene, polyhexafluoropropylene, polyethylene oxide, polypropylene oxide, polyphosphazene, polysiloxane, polyvinyl acetate, polyvinyl alcohol, polymethacrylic acid methyl, polyacrylic acid, polymethacrylic acid, styrene-butadiene rubber, nitrile-butadiene rubber, polystyrene, or polycarbonate can be cited. In particular, in view of electrochemical stability, polyacrylonitrile, polyvinylidene fluoride, polyhexafluoropropylene, or polyethylene oxide is preferable. The ratio of the polymer to the electrolytic solution varies according to the compatibility thereof. In general, however, the polymer corresponding to 5 wt % to 50 wt % of the electrolytic solution is preferably added.

Further, in the foregoing embodiment and the foregoing examples, descriptions have been given of the appropriate ranges derived from the results of the examples for the thicknesses of the cathode active material layer and the anode active material layer, the property of the carbon material contained in the anode active material layer, and the composition of the electrolytic solution in the battery of the invention. However, the foregoing descriptions do not always deny possibility that the thicknesses, properties and the composition become out of the foregoing ranges. That is, the foregoing appropriate ranges are particularly preferable ranges to obtain the effects of the invention. As long as the effects of the invention can be obtained, the thickness, the properties, and the contents may be slightly deviated from the foregoing ranges.

It should be understood by those skilled in the art that various modifications, combinations, sub-combinations and alternations may occur depending on design requirements and other factors insofar as they are within the scope of the appended claims or the equivalents thereof.

What is claimed is:

1. A battery comprising:
   a cathode;
   an anode; and
   an electrolytic solution,
   wherein,
      the cathode has a cathode active material layer with a thickness of from 100 μm to 130 μm,
      the anode has an anode active material layer containing a carbon material and having a thickness of from 85 μm to 120 μm and a volume density of from 1.7 g/cm$^3$ to 1.85 g/cm$^3$, the electrolytic solution contains a solvent including vinylene carbonate and 4-fluoro-1,3-dioxolane-2-one, and a weight ratio of vinylene carbonate to 4-fluoro-1,3-dioxolane-2-one in the solvent is in the range from 0.02 to 10.

2. The battery according to claim 1, wherein a content of 4-fluoro-1,3-dioxolane-2-one in the solvent is in the range from 0.1 wt % to 30 wt %.

3. The battery according to claim 1, wherein where a content of 4-fluoro-1,3-dioxolane-2-one in the solvent is A (wt %) and a specific surface area of the carbon material is B (m$^2$/g), a ratio B/A of the specific surface area B to the content A is from 0.02 to 1.3.

4. The battery according to claim 1, wherein the solvent further contains propylene carbonate.

5. The battery according to claim 1, wherein the solvent further contains ethylene sulfide.

6. The battery according to claim 1, wherein the electrolytic solution further contains lithium hexafluorophosphate.

7. The battery according to claim 1, wherein the carbon material includes at least one selected from the group consisting of graphite, graphitizable carbon, and non-graphitizable carbon.

8. The battery according to claim 1, wherein the carbon material includes graphite in which a lattice spacing $d_{002}$ in the C-axis direction in X-ray diffraction is under 0.338 nm, and a peak intensity ratio $I_D/I_G$ is over 0.01 and equal to or less than 2.0, where a peak intensity existing in the region from 1570 cm$^{-1}$ to 1630 cm$^{-1}$ is $I_G$ and a peak intensity existing in the region from 1350 cm$^{-1}$ to 1370 cm$^{-1}$ is $I_D$ in the Raman spectrum using argon laser light with a wavelength of 514.5 nm.

9. The battery according to claim 8, wherein the graphite has a bulk density of 1.2 g/cm$^3$ or more, and a breaking strength of 50 MPa or more.

10. The battery according to claim 1, wherein the solvent further contains vinylene carbonate.

11. The battery according to claim 10, wherein a content of 4-fluoro-1,3-dioxolane-2-one in the solvent is in the range from 0.1 wt % to 20 wt %.

12. The battery according to claim 10, wherein a content of vinylene carbonate in the solvent is in the range from 0.2 wt % to 5 wt %.

13. The battery according to claim 10, wherein a content of 4-fluoro-1,3-dioxolane-2-one in the solvent is in the range from 0.1 wt % to 20 wt %, a content of vinylene carbonate in the solvent is in the range from 0.2 wt % to 5 wt %, and where the content of 4-fluoro-1,3-dioxolane-2-one in the solvent is A (wt %) and a specific surface area of the carbon material is B (m$^2$/g), a ratio B/A of the specific surface area B to the content A is from 0.02 to 1.3.

14. The battery according to claim 10, wherein the solvent further contains ethyl methyl carbonate.

15. The battery according to claim 10, wherein the solvent further contains propylene carbonate.

16. The battery according to claim 10, wherein the electrolytic solution further contains lithium hexafluorophosphate.

* * * * *